United States Patent [19]
Berkmanns et al.

[11] Patent Number: 6,087,619
[45] Date of Patent: Jul. 11, 2000

[54] DUAL INTENSITY MULTI-BEAM WELDING SYSTEM

[75] Inventors: Joachim Berkmanns, Whitmore Lake; Frank W. Kuepper; Chen-Jen Rey Hsu, both of Ann Arbor, all of Mich.

[73] Assignee: Fraunhofer USA Resource Center, Ann Arbor, Mich.

[21] Appl. No.: 08/855,375

[22] Filed: May 13, 1997

[51] Int. Cl.[7] .................................................. B23K 26/26
[52] U.S. Cl. ............................... 219/121.63; 219/121.74
[58] Field of Search ...................... 219/121.63, 121.64, 219/121.74, 121.77

[56] References Cited

U.S. PATENT DOCUMENTS

| | | | |
|---|---|---|---|
| 4,691,093 | 9/1987 | Banas et al. | 219/121.63 |
| 5,155,323 | 10/1992 | Macken | 219/121.64 |
| 5,229,571 | 7/1993 | Neiheisel | 218/121.63 |
| 5,268,554 | 12/1993 | Ream | 219/121.74 |
| 5,393,956 | 2/1995 | Guth et al. | 219/121.64 |
| 5,591,360 | 1/1997 | Mombo-Caristan | 219/121.64 |
| 5,690,845 | 11/1997 | Fuse | 219/121.74 |
| 5,841,097 | 11/1998 | Esaka et al. | 219/121.64 |
| 5,874,708 | 2/1999 | Kinsman et al. | 219/121.64 |

FOREIGN PATENT DOCUMENTS

| | | |
|---|---|---|
| 4024299 | 2/1992 | Germany . |
| 62-144888 | 6/1987 | Japan . |

OTHER PUBLICATIONS

Patent Abstracts of Japan, vol. 10, No. 47 (M–456) dated Feb. 25, 1986 re Japanese Publication No. JP 60199585 published Sep. 10, 1985.

*Primary Examiner*—Geoffrey S. Evans
*Attorney, Agent, or Firm*—Benita J. Rohm; Raphael A. Monsanto

[57] ABSTRACT

A welding arrangement for welding first and second sheets of material to one another, the sheets having different figures from one another, employs a source of energy, illustratively a laser, for producing a primary beam of energy and propagating the beam toward a focusing element and a splitter. The splitter is formed of stepped mirrors that facilitate adjustment of the distance between the beams. The distance can be adjusted in response to the width of a gap between the sheets to be welded. The welding beams impinge upon respective ones of the sheets to be welded with an intensity characteristic that is responsive to the thickness of the sheets. Thus, the thicker sheet will be subjected to a higher intensity beam to insure penetration sufficient to effect a good continuous weld. One or more heat sources are provided to preheat the sheets of material so that thermal expansion will close the gap between them. Additionally, a monitoring arrangement controls the focus of the energy beams on the materials to be welded and the distances between the beams, in response to the width of a gap between the materials to be welded.

22 Claims, 3 Drawing Sheets ial to be welded, the thickness of the material to be welded, the desired depth of penetration, the rate of travel of the beam along the weld, etc. One technique that is useful for welding metal is generally referred to as "key hole" welding wherein an energy beam having a power density sufficient to form a hole in the material is applied to form a key hole surrounded by molten material. The focused energy beam is then translated with respect to the material to be welded, the molten material flowing around both sides of the key hole and coming together at the trailing edge thereof. Such deep penetration welding vaporizes a thin column of material through the work piece, so as to have a high depth-to-width aspect ratio in the fusion zone. Cooling of the molten material usually happens quickly via conduction through the surrounding unmolten material.

DUAL INTENSITY MULTI-BEAM WELDING SYSTEM

BACKGROUND OF THE INVENTION

1. Field of the Invention

This invention relates generally to arrangements for welding metals and plastics with multiple focused energy beams, such as laser beams, and more particularly, to a welding arrangement for joining materials of different thicknesses using energy beams having correspondingly different intensities.

2. Description of the Related Art

Several systems are available for welding materials using a beam of energy. With respect to metals, an energy beam, usually a laser, is focused on the metal to be welded to achieve a power density on the order of 1,000,000 watts per square centimeter. The actual power density required will depend upon a variety of factors, including the particular material to be welded, the thickness of the material to be welded, the desired depth of penetration, the rate of travel of the beam along the weld, etc. One technique that is useful for welding metal is generally referred to as "key hole" welding wherein an energy beam having a power density sufficient to form a hole in the material is applied to form a key hole surrounded by molten material. The focused energy beam is then translated with respect to the material to be welded, the molten material flowing around both sides of the key hole and coming together at the trailing edge thereof. Such deep penetration welding vaporizes a thin column of material through the work piece, so as to have a high depth-to-width aspect ratio in the fusion zone. Cooling of the molten material usually happens quickly via conduction through the surrounding unmolten material.

Generally, the end to be achieved by such welding is the attachment of two pieces of material with the weld. One such weld is called the "butt joint," wherein the materials are joined edge-to-edge. However, the materials to be joined do not always meet precisely with one another. Their respective edges may not be straight resulting in gaps, the sheet materials may be warped, or some other nonuniformity or imperfection may be present to prevent a good mating of the surfaces. The resulting gaps in the seam between the materials to be welded affect the amount of energy that is converted to heat in the material and affect the ability of the molten pools of material from each of the sheets to join one another in the trailing region of the key hole. The result is an imperfect weld having weak portions therealong.

Several techniques are established for manufacturing butt joints between sheet materials. The first technique employs a single stationary beam for joining the sheets. This method is well suited for straight lines and material combinations where the difference in thickness is not too great. In regions where the differences in material thicknesses is great, or where the weld to be effected is not linear so as to have tight radii, there is the possibility of dwelling on the thicker or thinner material. If the energy beam is directed during translation excessively to the thick material, the joint quality will be poor due to insufficiency of the quantum of material being melted or liquefied, and poor penetration. This results from the beam being of insufficient intensity. On the other hand, if the beam focuses unduly on the thin material, the intensity of the beam may be too high for the thin material and will result in drop-through of the weld metal.

Alignment of the energy beam is a significant problem, as focusing is generally effected to a tenth of a millimeter. Alignment has to be guaranteed within a tolerance of less than half of the diameter of the laser beam. One known approach to alleviating this problem is to tilt the beam in a plane perpendicular to the direction of weld travel. This method, however, is not sufficiently reliable to accommodate small radii on nonlinear welds, particularly at high weld speeds.

In addition to the foregoing, gaps often are present between the parts to be welded resulting from either improper edge preparation or the complexity of the shape of the components. In addition to the difficulty in filling such a gap with molten material to achieve a high quality seam, it is possible that the beam will propagate through the gap without welding the materials at all. Gapping, therefore, is a significant problem in joining flat sheet materials.

A second approach to manufacturing welded sheet materials is the oscillation of the energy beam in a plane perpendicular to the direction of the weld. Although this arrangement decreases alignment and gap difficulties, it requires a highly sophisticated mirror arrangement that oscillates or rotates at high frequencies and is cooled by water to handle the energy absorption. The ability to cool the mirror limits the power of the energy beam that can be used. In addition, the intensity of the weld spot is not adapted to either of the sheets of material.

More recently, a third manufacturing technique has been developed, which involves splitting the energy beam into two beams having equal intensity. This arrangement, however, provides no advantage when applied to dissimilar material thicknesses.

It is, therefore, an object of this invention to provide a welding arrangement of the type that employs an energy beam, such as a laser, for joining sheet materials having dissimilar thicknesses.

It is another object of this invention to provide a laser welding system that can reduce the deleterious effects of gaps between materials to be welded to one another, and thereby achieve a continuous good weld.

It is also an object of this invention to provide a welding arrangement that can achieve a good continuous weld between materials of dissimilar thicknesses, the weld having a nonlinear configuration.

It is a further object of this invention to provide a welding arrangement having at least two welding beams that have an adjustable distance therebetween.

It is additionally an object of this invention to provide an arrangement for controlling the relative intensities of two energy beams.

It is yet another object of this invention to provide an arrangement for controlling the characteristics of welding beams in response to a thickness characteristic of the material being welded.

It is yet a further object of this invention to provide an arrangement for controlling the characteristics of welding beams in response to a characteristic of a gap between materials being welded.

SUMMARY OF THE INVENTION

The foregoing and other objects are achieved by this invention which provides, in a first aspect thereof, a welding arrangement for welding first and second sheets of material to one another. In accordance with the invention, there is provided a source of energy for producing a primary beam of energy and propagating same along a first predetermined energy propagation path. There is additionally provided an arrangement for splitting the beam of energy into first and second beams having respective first and second intensities. An alignment arrangement causes the first sheet of material to be illuminated with the first beam of energy, and the second sheet of material to be illuminated with the second beam of energy, such that the first and second beams of energy form respective ones of first and second pools of molten material from the respective first and second sheets of material. The first and second pools of molten material join with one another to form a weld.

In the practice of a highly advantageous embodiment of the invention, the first and second sheets of material have respective first and second thicknesses, the first thickness being greater than the second. A translation arrangement moves the first and second sheets of material along a predetermined weld path with respect to the first and second beams of energy for forming a continuous weld.

In one embodiment, there is additionally provided a heat source for heating one of the sheets of material. In other embodiments, however, the heat source will heat all of the sheets of material to be welded to one another, or a heating element may be provided for each sheet of material. In a preferred embodiment, the heater is disposed forward of the energy beams along the path of the weld so as to preheat the materials and to effect thermal expansion in the materials whereby gaps therebetween are reduced in size.

In a preferred embodiment of the invention the source of energy is a source of laser light, and there is additionally provided a primary focus arrangement disposed optically intermediate of the source of laser light and the splitting arrangement for focusing a primary beam of laser light in the direction of the splitting arrangement. In one embodiment, the primary focus arrangement is formed of a lens that is disposed in the first predetermined path for focusing the primary beam of laser light.

In a further embodiment, the primary focus arrangement is a focusing mirror arranged in the predetermined path for focusing the primary beam of laser light and reflecting the focused primary beam of laser light along a second predetermined path. In this embodiment, there is additionally provided a displacement arrangement for translating the focusing mirror along the first predetermined path. The splitting arrangement is formed of a step mirror arranged in the second predetermined path for splitting the focus primary beam of laser light into the first and second beams of laser light. The first and second beams of laser light are separated from one another by a distance that is responsive to a step characteristic of the step mirror arrangement. The relative intensities of the first and second beams of laser light are responsive to the displacement, in this embodiment, of the focusing mirror along the first predetermined path. The intensities of the first and second beams of laser light are advantageously made responsive to a difference between the thicknesses of the first and second sheets of material.

In accordance with a further aspect of the invention, there is provided a welding system for welding first and second materials of respective first and second thicknesses to one another. An energy source produces a primary beam of energy and propagates the primary beam along a first predetermined energy propagation path. A splitting arrangement splits the beam of energy into first and second beams and a directing arrangement directs the first beam of energy to the first material and the second beam of energy to the second material. The first and second beams energy are separated by a predetermined distance from one another, such that the first beam of energy impinges upon the first material with a first energy beam intensity characteristic and the second beam of energy impinges upon the second material with a second energy beam intensity characteristic. The first and second energy beam intensity characteristics are determined in response to the first and second thicknesses, respectively.

In one embodiment, the splitting arrangement is formed of a step mirror having first and second mirror surfaces that are translatable with respect to one another. The predetermined distance between the first and second beams of energy is determined in response to the translation between the first and second mirror surfaces. The direction of translation between the first and second mirror surfaces is parallel to the beam of energy. There is additionally provided a focusing arrangement that is optically interposed between the energy source and the splitting arrangement, whereby the beam of energy is focused in the direction of the first and second mirror surfaces. In this manner, the relative intensities of the first and second energy beams are determined substantially in response to the relative proportions of the beam of focus energy that impinges upon the first and second mirror surfaces. In one embodiment, the intensity characteristics of the first and second energy beams are substantially determined in response to the difference between the distances between the surfaces of the first and second sheets of material and the respectively associated ones of the first and second mirror surfaces.

In accordance with a still further aspect of the invention, there is provided a two-beam welding arrangement for welding materials having different thicknesses from one another. The twin beam welding arrangement is provided with an arrangement for directing a first energy beam onto a thinner one of the materials in accordance with the relationship $d_1 \sim I_1 \cdot r_1$. A further arrangement is provided for directing a second energy beam onto a thicker one of the materials in accordance with the relationship $d_2 \sim I_2 \cdot r_2$, where a distance $d_1$, of the energy beam satisfies the condition:

$$d_1 = \frac{gt_1}{(t_2 - t_1)}$$

where:

$I_1$ is the intensity of the first beam;

$I_2$ is the intensity of the second beam;

$r_1$ is the radius of the first energy beam as it impinges upon the proximal surface of the thinner material being welded;

$r_2$ is the radius of the second energy beam as it impinges upon the proximal surface of the thicker material being welded;

$d_1$ is the distance between the center of the first energy beam to the edge of the thinner material;

$d_2$ is the distance between the center of the second energy beam to the edge of the thicker material;

g is distance across the gap between the materials being welded;

$t_1$ is the thickness of the thinner material;

and $t_2$ is the thickness of the thicker material.

The width of the weld region of the thinner material, $w_1$, corresponds to the inward extent of the melt from the original edge thereof, and the width of the weld region of the thicker material, $w_2$, corresponds to the inward extent of the melted thicker material from its corresponding original edge. The total width of the weldment, therefore, is the sum of the melted regions $w_1$ and $w_2$, and the original gap g.

In accordance with a specific illustrative embodiment of the invention, the arrangement for directing a first energy beam and the arrangement for directing a second energy beam each are formed of a respective mirror surface, the mirror surfaces being translatable with respect to one another. A distance between the first and second energy beams is determined in response to the translation of the first and second mirror surfaces relative to one another. Additionally, there is provided a translatable focusing arrangement for directing a focused beam of energy to the respective mirror surfaces, the relative intensities of the first and second energy beams being responsive to a location of said translatable focusing arrangement.

In a further embodiment of the invention, there is provided a system for measuring a gap between the materials, and an arrangement for translating the first and second mirror surfaces relative to one another in response to the system for measuring.

In a still further embodiment, there is provided pre-heat means for preheating at least a selectable one of the materials for reducing the gap between the materials. The pre-heat means may be in the form of an additional energy beam, or a heater element.

BRIEF DESCRIPTION OF THE DRAWING

Comprehension of the invention is facilitated by reading the following detailed description, in conjunction with the annexed drawing, in which.

DETAILED DESCRIPTION

Figure 1:
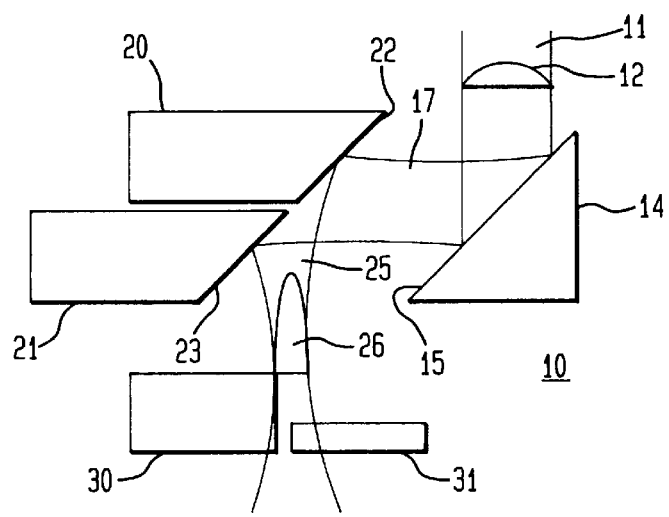
FIG. 1 is a schematic representation of a mirror arrangement that is configured to produce a single focused energy beam.

FIG. 1 is a schematic representation of a focusing arrangement 10 wherein a primary beam 11 having an intensity distribution represented by energy intensity distribution 12 is arranged to impinge upon a reflecting mirror 14. Reflecting mirror 14 has a concave mirror surface 15 arranged at an angle with respect to the propagation path of primary beam 11. The primary beam is reflected from concave mirror surface 15 in a second direction which is transverse to the original path of propagation of primary beam 11. Reflected and focused beam 17 impinges upon a pair of angled mirrors 20 and 21 that have respective mirrored surfaces 22 and 23.

In this embodiment, angled mirrors 20 and 21 are arranged such that mirrored surfaces 22 and 23 are coplanar so as to produce a single focused welding beam 25 having an energy intensity distribution 26. The welding beam is shown to impinge upon sheets of material 30 and 31 which have different thicknesses as shown, and are desired to be welded to one another.

As previously indicated, a single beam, such as welding beam 25 is suitable for welding materials that are not significantly different in thickness and along straight lines. However, the single welding beam approach is problematical when the differences in the material thicknesses are large, or when the weld path is nonlinear and has tight radii.

Figure 2:
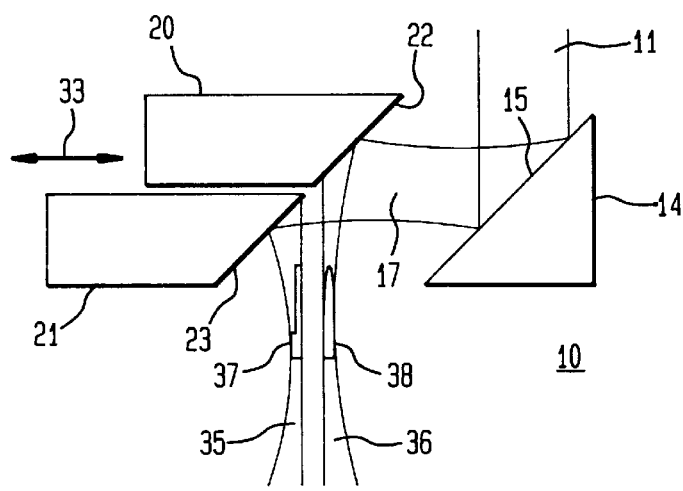
FIG. 2 is a schematic representation of the mirror arrangement of FIG. 1 arranged to produce two welding beams of energy of approximately equal intensity.

FIG. 2 is a schematic representation of the focusing arrangement 10 discussed hereinabove with respect to FIG. 1. However, angled mirrors 20 and 21 are displaced from one another in the direction of arrow 33 whereby mirrored surfaces 22 and 23 are no longer coplanar, but instead form a step. The stepped mirror produces two welding beams 35 and 36 each beam characterized, in this embodiment, by respective energy intensity distributions 37 and 38. Although the energy intensity distributions of welding beams 35 and 36 are substantially similar, the energy density applied to the sheet materials (not shown in this figure) will be different as a result of the differences in the thicknesses, as will be described below with respect to FIG. 4.

Figure 3:
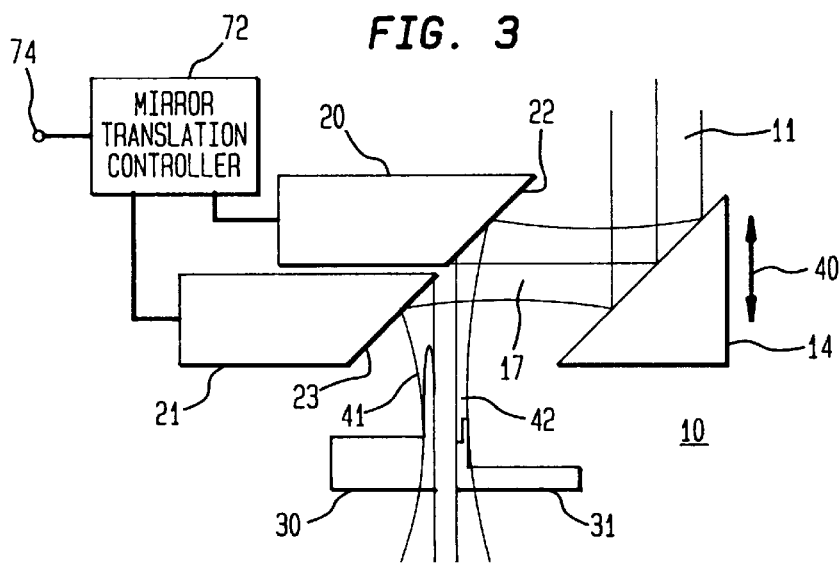
FIG. 3 is a schematic representation of the mirror arrangement of FIG. 1 wherein the focusing mirror has been displaced to produce welding beams of unequal intensity.

FIG. 3 is a schematic representation of the embodiment of FIG. 2 wherein reflecting mirror 14 has been displaced in the direction of arrow 40. As shown, reflected and focused beam 17 impinges to a larger extent on mirrored surface 23 such that corresponding welding beam 41 has a higher energy intensity distribution than welding beam 42 which is reflected from mirrored surface 22. As shown herein, welding beam 41 is directed to impinge upon sheet material 30, which is thicker than sheet material 31.

Figure 4:
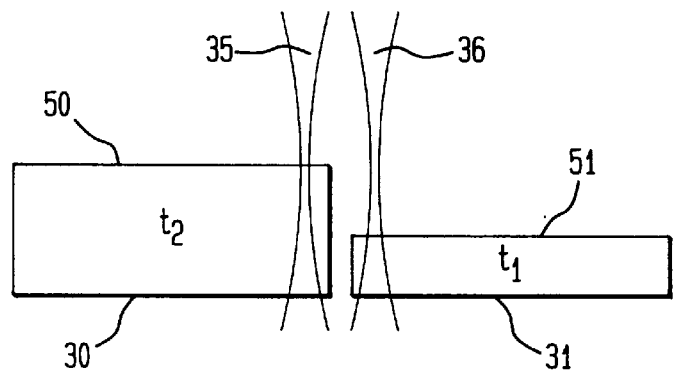
FIG. 4 is a schematic representation of two welding beams impinging upon respective sheets of material, the power density of the impinging beams being different as a result of differences in the thicknesses of the sheets being welded.

FIG. 4 is a schematic representation of sheets 30 and 31 having welding beams 35 and 36 impinging respectively thereon. The welding beams, for purposes of this illustration, are substantially identical, as would be the case with the configuration described hereinabove with respect to FIG. 2. Sheet 31 is shown to have a thickness of $t_1$, and sheet 30 is shown to have a thickness of $t_2$. The welding beams are focused so as to provide a maximum energy intensity at a point along the path of propagation which corresponds to upper surface 50 of sheet 30. Upper surface 51 of sheet 31 is essentially further along the path of propagation of welding beam 36 whereby the welding beam is not precisely in focus and delivers to sheet 31 a lower energy density. Thus, although the intensities of welding beams 35 and 36 are substantially the same, the energy intensities applied to the surfaces of the sheet materials are different by virtue of the difference in the height between upper surface 50 and upper surface 51. Thus, in this embodiment where the laser beams are arranged to focus on the surface of a thicker material, a self-adaptive process is produced, characterized by higher intensities on the thicker material and lower intensities on the thinner material as a result of beam propagation. In this case, there is no need to produce further adjustment of the beam intensity. However, this approach is useful for only a limited range of material thickness combinations.

Figure 5:
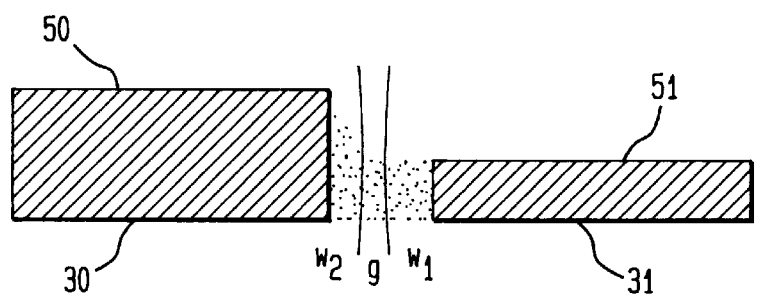
FIG. 5 is a schematic representation of the welded sheets.

FIG. 5 is a cross-sectional representation of sheets 30 and 31 after they have been welded in accordance with the invention herein. In this figure, $w_1$ corresponds to the width of the weld (melted) region of the thinner material, extending inward (to the right) from the original edge thereof, and $w_2$ corresponds to the width of the weld (melted) region of the thicker material, extending inward (to the left) from the original edge thereof. Thus, the total width of the weldment is the sum of the melted regions $w_1$ and $w_2$, and the original gap g.

Figure 6:
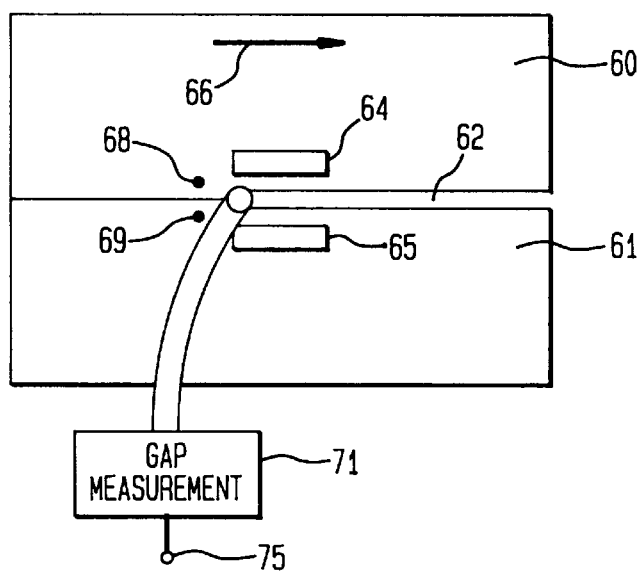
FIG. 6 is a schematic representation that illustrates a pair of heat sources associated with respective ones of the sheets of material being welded to effect closure of the gap between the sheets by operation of thermal expansion.

FIG. 6 is a schematic representation of two sheets of material 60 and 61 having a gap 62 therebetween. This figure shows a pair of heat sources 64 and 65 that are urged along sheets 60 and 61 in the direction of arrow 66. Thus, the heat sources are arranged in advance of weld beam spots 68 and 69. As shown, as the heat sources with the trailing weld beam spots are advanced along gap 62, thermal expansion of sheets 60 and 61 resulting from the heating effect of heat sources 64 and 65 cause the gap to close, whereupon a continuous weld (not shown) is achieved.

In one highly advantageous embodiment of the invention, a gap measuring apparatus 71 is provided for producing a signal responsive to the width of the gap. Such a signal is used to control the distance between the weld beams by controlling the translation of the angled mirrors with respect to one another, as shown in FIG. 3. FIG. 3 shows a mirror translation control arrangement 72 that controls the translation between the angled mirrors and response to a signal received at an input terminal 74 thereof. The input terminal receives a signal that is produced at an output terminal 75 of gap measurement arrangement 71. The relationship between gap measurement arrangement 71 and mirror translation controller 72 is as a closed loop whereby the interbeam distance is controlled in response to the gap width.

Figure 7:
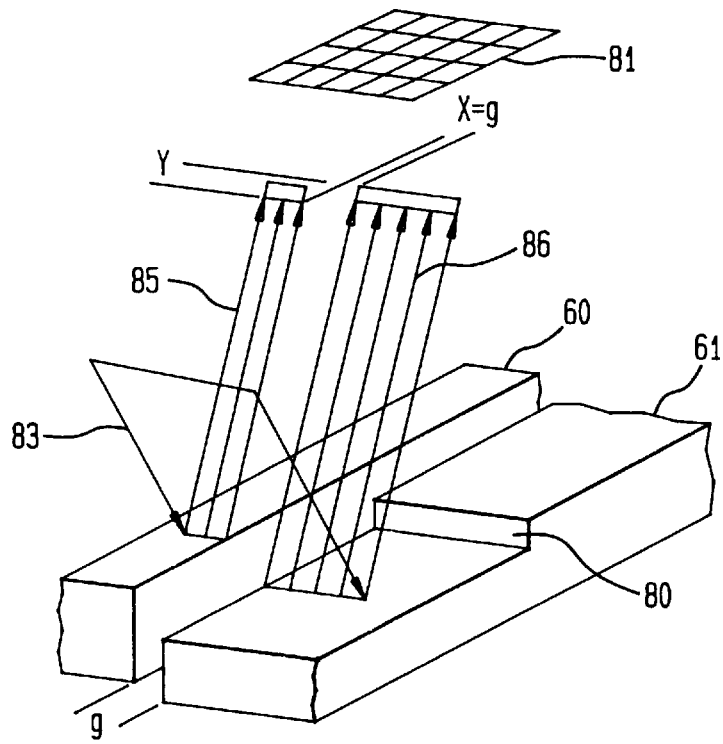
FIG. 7 is a schematic representation of a system for developing signals responsive to the gap distance between the sheets of material being welded, as well as variations in height.

FIG. 7 is a schematic representation of a system for developing signals responsive to the gap distance between the sheets of material being welded, as well as variations in height. As shown, sheets of material 60 and 61 are arranged adjacent to one another, as previously described, and have a gap g therebetween. Sheet 61 is shown to have a discontinuity 80 in its thickness that, as will be described below, will produce an indication responsive thereto on a CCD array 81 that receives a reflected portion of an incident light 83. Incident light 83 may be produced by a commercially available light source (not shown), and may be coherent.

In operation, incident light is propagated along a plane, as shown, that intersects the upper surfaces of sheets of material 60 and 61. In this specific illustrative embodiment of the invention, the incident light has a planar characteristic. However, the invention herein can function using a scanning light source (not shown), a plurality of point sources, or equivalent.

Figure 8:
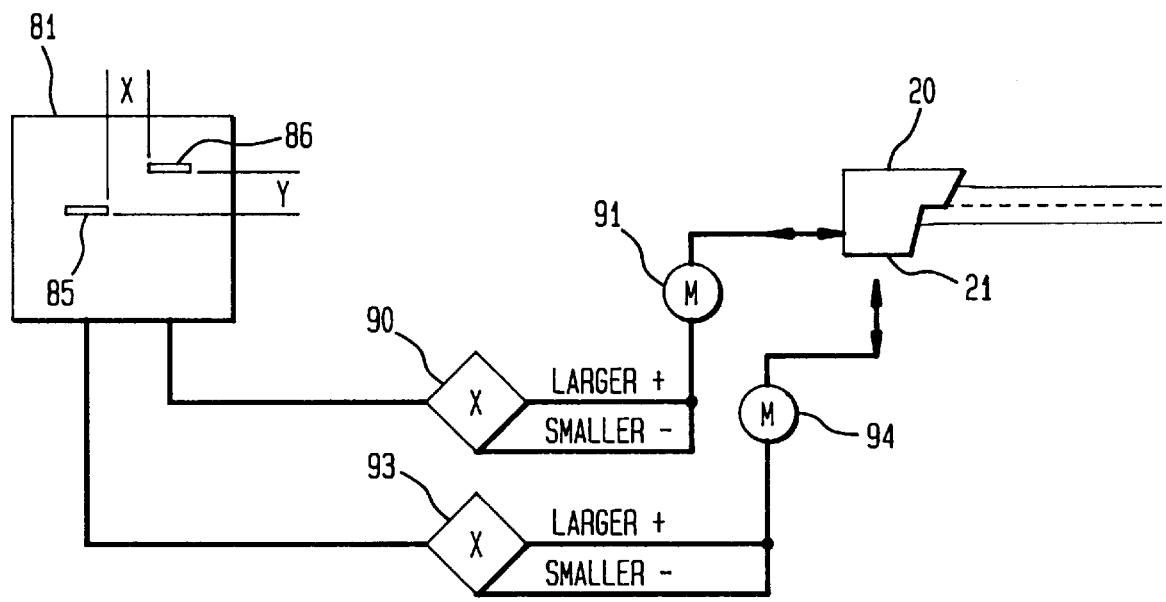
FIG. 8 is a schematic representation of an arrangement for controlling the motion of the mirrors in response to the system of FIG. 7.

FIG. 8 is a schematic representation of an arrangement for controlling the motion of the mirrors in response to the system of FIG. 7. As shown in FIGS. 7 and 8, incident light 83 is reflected onto CCD array 81 to produce thereon indications corresponding to the light reflected from sheets of material 60 and 61, respectively. More specifically, incident light 83 is reflected as reflected component 85 from the surface of sheet 60 and reflected component 86 from the surface of sheet 61. The reflected components are shown in FIG. 8 as they would impinge upon the CCD array, displaced from one another in the x and y directions. The displacement in the x direction has a magnitude X which corresponds to the thickness of gap g. The displacement in the y direction has a magnitude Y which corresponds to the differences in the thickness between sheets of material 60 and 61, respectively.

FIG. 8 further shows in schematic form a generalized controller arrangement whereby angled mirrors 20 and 21 displaced in response to reflected components 85 and 86. Control circuit 90 operates a motor 91 to effect displacement of the angled mirror 21 in the x direction. Similarly, control circuit 93 operates a motor 94 to effect displacement of the angled mirrors in the y direction.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A welding arrangement for welding first and second sheets of material to one another having respective first and second thicknesses, the arrangement comprising:

a source of energy for producing a primary beam of energy and propagating the primary beam of energy along a first predetermined energy propagation path;

a splitter for splitting the beam of energy into first and second beams of energy having respective first and second intensities, said splitter having a step mirror arrangement having first and second mirror surfaces that are translatable with respect to one another, the predetermined distance between the first and second beams of energy being responsive to the translation between the first and second mirror surfaces;

alignment means for illuminating the first sheet of material with the first beam of energy and the second sheet of material with the second beam of energy;

a controller for displacing the first and second beams of energy in response to a difference between the first and second thicknesses of the sheets of material;

whereby the first and second beams of energy form respective ones of first and second pools of molten material from the first and second sheets of material, the first and second pools of molten material joining with one another to form a weld.

2. The welding arrangement of claim 1, wherein there is further provided translation means for moving the first and second sheets of material along a predetermined weld path with respect to the first and second beams of energy for forming a continuous weld.

3. The welding arrangement of claim 1, wherein there is further provided at least one heat source means for heating at least one of the first and second sheets of material.

4. The welding arrangement of claim 1, wherein said source of energy is a source of laser light, and there is further provided primary focus means arranged optically intermediate of said source of laser light and said splitter, for focusing a primary beam of laser light in the direction of said splitter.

5. The welding arrangement of claim 4, wherein said primary focus means comprises a lens arranged in the first predetermined path for focusing the primary beam of laser light.

6. The welding arrangement of claim 4, wherein said primary focus means comprises a focusing mirror arranged in the first predetermined path for focusing the primary beam of laser light and reflecting the focused primary beam of laser light along a second predetermined path.

7. The welding arrangement of claim 6, wherein there is further provided displacement means for translating said focusing mirror along the first predetermined path.

8. The welding arrangement of claim 6, wherein the respective intensities of said first and second beams of laser light are responsive to said displacement means.

9. The welding arrangement of claim 6, wherein the first and second intensities of said first and second beams of laser light are responsive to a difference between the thicknesses of the first and second sheets of material.

10. A welding system for welding first and second materials of respective first and second thicknesses to one another, the welding system comprising:

an energy source for producing a primary beam of energy and propagating the primary beam of energy along a first predetermined energy propagation path;

a splitter for splitting the beam of energy into first and second beams of energy, said means for splitting having a step mirror arrangement having first and second mirror surfaces that are translatable with respect to one another, the predetermined distance between the first and second beams of energy being responsive to the translation between the first and second mirror surfaces;

means for directing the first beam of energy to the first material, and the second beam of energy to the second material, the first and second beams of energy being separated by a predetermined distance from one another;

whereby the first beam of energy impinges upon the first material with a first energy beam intensity characteristic and the second beam of energy impinges upon the second material with a second energy beam intensity characteristic, the first and second energy beam intensity characteristics being responsive to the first and second thicknesses, respectively.

11. The welding system of claim 10, wherein said first and second mirror surfaces are translatable with respect to each other along a path of translation that is parallel to the beam of energy.

12. The welding system of claim 11, wherein there is further provided focusing means optically interposed between said energy source and said splitter, whereby the beam of energy is focused in the direction of the first and second mirror surfaces.

13. The welding system of claim 12, wherein the first and second energy beam intensity characteristics are substantially responsive to the relative proportions of the beam of focused energy that impinges on the first and second mirror surfaces.

14. The welding system of claim 12, wherein the first and second energy beam intensity characteristics are substantially responsive to the difference between the distances between the surfaces of the first and second sheets of material and their respectively associated ones of the first and second mirror surfaces.

15. A two-beam welding arrangement for welding materials having different thicknesses from one another, the twin beam welding arrangement comprising:

means for directing a first energy beam onto a thinner one of the materials in accordance with the relationship $d_1 \sim I_1 \cdot r_1$;

means for directing a second energy beam onto a thicker one of the materials in accordance with the relationship $d_2 \sim I_2 \cdot r_2$;

wherein a distance $d_1$ of the energy beam satisfies the condition, $$d_1 = \frac{g t_1}{(t_2 - t_1)}$$

where:

$I_1$ is the intensity of the first beam;

$I_2$ is the intensity of the second beam;

$r_1$ is the radius of the first energy beam as it impinges upon the proximal surface of the thinner material being welded;

$r_2$ is the radius of the second energy beam as it impinges upon the proximal surface of the thicker material being welded;

$d_1$ is the distance between the center of the first energy beam to the edge of the thinner material;

$d_2$ is the distance between the center of the second energy beam to the edge of the thicker material;

g is distance across the gap between the materials being welded;

$t_1$ is the thickness of the thinner material;

and $t_2$ is the thickness of the thicker material.

16. The two-beam welding arrangement of claim 15, wherein said means for directing a first energy beam and said means for directing a second energy beam each comprise a respective mirror surface, said mirror surfaces being translatable with respect to one another in response to the width of a gap between the materials of different thicknesses.

17. The two-beam welding arrangement of claim 16, wherein there is further provided translatable focusing means for directing a focused beam of energy to said respective mirror surfaces, the relative intensities of the first and second energy beams being responsive to a location of said translatable focusing means.

18. The two-beam welding arrangement of claim 16, wherein a distance between the first and second energy beams is responsive to the translation of the first and second mirror surfaces relative to one another.

19. The two-beam welding arrangement of claim 18, wherein there are further provided:

means for measuring a gap between the materials;

means for translating the first and second mirror surfaces relative to one another in response to said means for measuring.

20. The two-beam welding arrangement of claim 19, wherein there is further provided pre-heat means for pre-heating at least a selectable one of the materials for reducing the gap between the materials.

21. The two-beam welding arrangement of claim 20, wherein said pre-heat means comprises an energy beam.

22. The two-beam welding arrangement of claim 20, wherein said pre-heat means comprises a heater element.

* * * * *